(12) United States Patent
Rossiquet et al.

(10) Patent No.: US 9,321,691 B2
(45) Date of Patent: Apr. 26, 2016

(54) PRODUCT MADE FROM SILICON CARBIDE FOR SHIELDING

(71) Applicants: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

(72) Inventors: Gilles Rossiquet, Louzac Saint Andre (FR); Eric Jorge, Les Valayans (FR)

(73) Assignees: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/408,181

(22) PCT Filed: May 17, 2013

(86) PCT No.: PCT/FR2013/051096
§ 371 (c)(1),
(2) Date: Dec. 15, 2014

(87) PCT Pub. No.: WO2013/186453
PCT Pub. Date: Dec. 19, 2013

(65) Prior Publication Data
US 2015/0152012 A1 Jun. 4, 2015

(30) Foreign Application Priority Data
Jun. 15, 2012 (FR) ...................................... 12 55632

(51) Int. Cl.
*C04B 35/565* (2006.01)
*F41H 5/04* (2006.01)
(Continued)

(52) U.S. Cl.
CPC ............. *C04B 35/565* (2013.01); *C04B 35/573* (2013.01); *C04B 35/6261* (2013.01);
(Continued)

(58) Field of Classification Search
CPC .. C04B 35/565; C04B 35/573; C04B 35/575; C04B 35/5755; F41H 5/0421
See application file for complete search history.

(56) References Cited

U.S. PATENT DOCUMENTS 6,531,423 B1 * 3/2003 Schwetz et al. ................. 501/89
7,989,380 B2 * 8/2011 Mikijelj et al. ................. 501/91
(Continued)

FOREIGN PATENT DOCUMENTS

WO     2007/126784 A2     11/2007

OTHER PUBLICATIONS

International Search Report issued in International Patent Application No. PCT/FR2013/051096, dated Aug. 13, 2013.

*Primary Examiner* — Karl Group
(74) *Attorney, Agent, or Firm* — Pillsbury Winthrop Shaw Pittman LLP

(57) ABSTRACT

A product obtained by solid-phase sintering of a silicon carbide powder and of a sintering additive, the product having a relative density of greater than 98.5% and including: more than 92% by weight of SiC present in the form of grains, less than 2% by weight of elemental oxygen, less than 6% by weight, in total, of other elements, wherein more than 10% by number of the SiC grains, on the basis of the total number of the grains, have an elongation factor F of greater than 3 ($F>3$), wherein more than 50% by number of the grains, the elongation factor F of which is greater than 3, have a width of greater than 3 micrometers, and wherein the other SiC grains in the product have a mean equivalent diameter of greater than 1 micrometer and less than 20 micrometers.

28 Claims, 1 Drawing Sheet

100 μm

(51) Int. Cl.
*C04B 35/573* (2006.01)
*C04B 35/626* (2006.01)

(52) U.S. Cl.
CPC ....... *C04B35/6263* (2013.01); *C04B 35/62655* (2013.01); *F41H 5/0414* (2013.01); *F41H 5/0421* (2013.01); *C04B 2235/3222* (2013.01); *C04B 2235/3813* (2013.01); *C04B 2235/3821* (2013.01); *C04B 2235/3826* (2013.01); *C04B 2235/3839* (2013.01); *C04B 2235/3843* (2013.01); *C04B 2235/422* (2013.01); *C04B 2235/48* (2013.01); *C04B 2235/5409* (2013.01); *C04B 2235/5436* (2013.01); *C04B 2235/6562* (2013.01); *C04B 2235/6565* (2013.01); *C04B 2235/6567* (2013.01); *C04B 2235/666* (2013.01); *C04B 2235/72* (2013.01); *C04B 2235/723* (2013.01); *C04B 2235/76* (2013.01); *C04B 2235/77* (2013.01); *C04B 2235/78* (2013.01); *C04B 2235/786* (2013.01); *C04B 2235/788* (2013.01); *C04B 2235/85* (2013.01); *C04B 2235/96* (2013.01)

(56) References Cited

U.S. PATENT DOCUMENTS

| | | | |
|---|---|---|---|
| 8,003,042 B2 * | 8/2011 | Cutler et al. | 264/682 |
| 2002/0160902 A1 | 10/2002 | Lesniak et al. | |
| 2008/0093779 A1 * | 4/2008 | Cutler et al. | 264/682 |
| 2010/0130344 A1 * | 5/2010 | Mikijelj et al. | 501/91 |

* cited by examiner

100 μm

100 μm

PRODUCT MADE FROM SILICON CARBIDE FOR SHIELDING

CROSS-REFERENCE TO RELATED APPLICATIONS

This application is the U.S. National Stage of PCT/FR2013/051096, filed May 17, 2013, which in turn claims priority to French Application No. 1255632, filed Jun. 15, 2012. The contents of all of these applications are incorporated herein by reference in their entirety.

The invention relates to a dense product based on silicon carbide that can in particular be used for its ballistic properties, in armor or armor-plating components.

Ceramic materials are among the most important constituents of armor or armor-plating systems. In particular, silicon carbide or SiC is among the ceramic materials used in such an application.

Thus, for armor-plated vehicles and for soldiers wearing armor components that enable them to be protected from projectiles, the additional weight linked to wearing armor-plating is an essential element. Indeed, this additional weight may be an obstacle to rapid movements, or generate additional fatigue for the soldiers.

The use of ceramic materials such as silicon carbide allows in particular a significant weight saving.

There is therefore continuously a need to improve the ceramic products used as armor-plating, this improvement being measured in particular by their ballistic performance. The object of the present invention is therefore to propose a novel material different from the products currently used in the field and the performances of which are improved, in particular that has a smaller depth of penetration of a projectile. Depending on the choice made, the improvement in this parameter with respect to the materials of the art may make it possible either to provide a greater resistance and therefore a better level of safety via the armor-plating, or to reduce the thickness of the armor-plating in order to reduce its weight, while retaining an identical level of safety, that is to say an identical ballistic performance.

According to known principles, in order to improve the ballistic performances of armor-plating (consisting for example of a solid-phase sintered silicon carbide material such as Hexoloy® SA sold by the company Saint-Gobain, the datasheet of which, available on the site www.hexoloy.com, specifies that the size of the grains is between 4 and 10 micrometers and that the density is equal to 3.10 g/cm$^3$), it is customary, on the one hand, to favor materials of higher density and, on the other hand, to select a microstructure in which the mean size of the grains is limited, since it is generally acknowledged that a combined action on these two criteria makes it possible to obtain, for an identical product based on an identical material, the best ballistic performances.

An alternative and original route has been followed by the applicant company that consists in increasing the density while this time increasing the size of the SiC grains in the material. The size of the grains according to the invention thus reaches a level never described for such densities. Contrary to expectations, it has been found that the ballistic performances of the product according to the invention are greater than those of Hexoloy® SA.

Examples 29 and 34 from WO 2007/126784 describe a SiC product densified using Al, AlN, C and B$_4$C sintering additives.

According to the data reported in table 14 on page 26 of this publication, it is possible to determine that the relative density of the products obtained according to these examples is between 97.5% and 98%.

According to a first aspect, the present invention relates to a product obtained by solid-phase sintering of a silicon carbide powder and of a sintering additive, said product having a relative density of greater than 98.5% and comprising:
more than 92% by weight of SiC present in the form of grains,
less than 2% by weight of elemental oxygen,
less than 6% by weight, in total, of other elements, said product being characterized in that:
more than 10% by number of the SiC grains, on the basis of the total number of said grains, have an elongation factor F of greater than 3 (F>3),
more than 50% by number of said grains, the elongation factor F of which is greater than 3, have a width of greater than 3 micrometers,
the other SiC grains in said product have a mean equivalent diameter of greater than 1 micrometer, preferably greater than 4 micrometers, or even greater than 5 micrometers, and less than 20 micrometers.

The following designations and definitions are given, in connection with the preceding description of the present invention:

"F" or "elongation factor" of an anisotropic grain of elongated general shape, is the ratio of its length "L", measured along a directrix, and its width "l". The elongation factor is therefore defined according to the invention by the ratio F=L/l.

The length L of the grain is measured along a straight directrix of said grain, and corresponds to its greatest length.

The width l is defined as the greatest width measured in all of the planes transverse to said directrix (i.e. perpendicular to the directrix).

The equivalent diameter of grains is understood to mean the half-sum of the greatest length of the grain and of the greatest width of the grain, measured in a direction perpendicular to said greatest length.

The factor F and the equivalent diameter are conventionally determined from observation of the microstructure of the sintered material, conventionally using images taken by SEM (scanning electron microscopy) on a cross section of the sintered product. It has been verified in the examples that follow that said microstructure is substantially identical, irrespective of the orientation of the cross section.

Liquid-phase sintering is understood according to the customary definition to mean sintering in which at least one of the sintering additives, several additives or else a phase formed from the combination of certain of these additives, or even certain impurities of the product to be sintered, are capable of forming a liquid phase during the sintering heat treatment, in an amount such that it is sufficient to enable the rearrangement of the grains and to thus bring them into contact with one another. One such well-known example of the latter case is in particular the phase Y$_3$Al$_5$O$_{12}$.

In contrast, solid-phase sintering is understood to mean sintering in which none of the additives added that enable the sintering, or else no phase formed from the combination of certain of these additives, or even no impurity of the product to be sintered, is capable of forming a liquid phase in an amount such that it is sufficient to enable the rearrangement of the grains and to thus bring them into contact with one another. This is in particular the case when no liquid phase is created during the sintering. A product obtained by solid-phase sintering is commonly referred to as "solid-phase sintered". The product according to the present invention therefore does not preferably contain the elements yttrium and aluminum other than in the form of impurities. In particular, an amount of yttrium of less than 0.05% by weight is preferred.

A sintering additive, often more simply referred to as "additive" in the present description, is understood to mean a compound customarily known for enabling and/or accelerating the kinetics of the sintering reaction.

The relative density of a product is understood to mean the ratio equal to the bulk density divided by the absolute density, expressed as a percentage.

The bulk density of a product is understood, within the meaning of the present invention, to mean the ratio equal to the weight of the product divided by the volume that said product occupies.

The absolute density of a product is understood, within the meaning of the present invention, to mean the ratio equal to the weight of solids of said product after milling to a fineness such that substantially no closed porosity remains, divided by the volume of this weight after milling. It can be measured by helium pycnometry.

The expressions "containing a", "comprising a" or "consisting of a" are understood to mean "consisting of at least one", unless otherwise indicated.

Unless otherwise indicated, in the present description, all the percentages are weight percentages.

Figure 1:
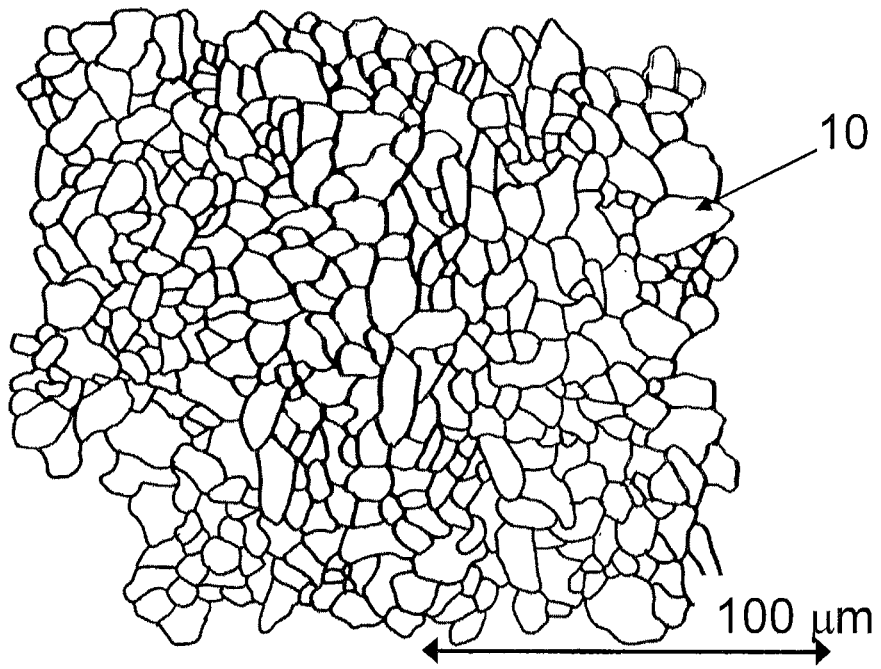
FIG. 1 is a representation of the image obtained using a scanning electron microscope of a prior art sample including an assembly of grains according to example 1.

Described below are various preferred embodiments of the present invention which may of course and where appropriate be combined with one another:

Said product comprises between 0.1% and 4% by weight of at least one other element chosen from boron, titanium, zirconium and free carbon and less than 2% by weight, in total, of other elements. Said other elements may be essentially present in the form of other carbon-based phases, distinct from free carbon and silicon carbide, and of impurities. The term "impurities" is understood to mean the inevitable constituents, unintentionally and unavoidably introduced with the raw materials or resulting from reactions with these constituents. The impurities are not necessary constituents, but only tolerated constituents. Such an impurity consists in particular of silica, disadvantageously known for inhibiting the sintering of SiC. Without departing from the scope of the invention, it is possible to limit the silica impurity by washing the SiC powders or even the sintering additive in a prior step and/or by adding carbon-containing additives to the initial mixture, in order to eliminate it during the sintering.

The sintering additives mentioned above are preferably selected from carbon, carbides of boron, titanium and zirconium or borides of zirconium and titanium, alone or as a mixture, for example selected from $B_4C$, $ZrB_2$, TiC, $TiB_2$, and carbon, alone or as a mixture, without this list being of course exhaustive, and also the known precursors of such compounds. According to the invention, a precursor of a constituent is a compound capable, during sintering, of resulting in this constituent. Replacing a constituent with an "equivalent" amount of a precursor of this constituent does not modify the amounts of said constituent in the sintered product obtained.

The sum of the elements boron, free carbon, titanium and zirconium, $B+C_1+Ti+Zr$, is greater than 0.1%, preferably greater than 0.2%, more preferably greater than 0.5%, or greater than 0.75% by weight.

The sum of the elements boron, free carbon, titanium and zirconium is less than 4%, preferably less than 3.2%, preferably less than 3%, more preferably less than 2.5%, or even less than 2%, or less than 1.5%, or less than 1% by weight.

The content of free carbon is less than 2.7%, preferably less than 2%, preferably less than 1.4%, or less than 1%, or less than 0.7% by weight.

According to a first preferred possible embodiment, the product comprises the boron element and free carbon in the following proportions:
  the content of boron element is greater than 0.1%, preferably greater than 0.15% by weight,
  the content of boron element is less than 0.5%, preferably less than 0.4%, or less than 0.3% by weight,
  the content of free carbon is greater than 0.1%, preferably greater than 0.3%, preferably greater than 0.5% by weight,
  the content of free carbon is less than 2.7%, preferably less than 2%, preferably less than 1.4%, or less than 1%, or less than 0.7% by weight.

This embodiment may in particular result from the use of $B_4C$ and carbon as solid-phase sintering additive.

According to a second embodiment, the product comprises the boron element in the following proportions:
  the content of boron element is greater than 0.1%, preferably greater than 0.15% by weight,
  the content of boron element is less than 0.5%, preferably less than 0.4%, or less than 0.3% by weight,
  the content of elemental oxygen is less than 0.5%, preferably less than 0.3% by weight.

This embodiment may in particular result from the use of $B_4C$ as solid-phase sintering additive.

According to a third possible embodiment, the product comprises free carbon in the following proportions:
  the content of free carbon is greater than 0.1%, preferably greater than 0.3%, preferably greater than 0.5% by weight,
  the content of free carbon is less than 2.7%, preferably less than 2%, preferably less than 1.4%, or less than 1%, or less than 0.7% by weight.

This embodiment may in particular result from the use of carbon as solid-phase sintering additive.

According to a fourth possible embodiment, the product comprises the titanium element and free carbon in the following proportions:
  the content of titanium element is greater than 0.1%, preferably greater than 0.15% by weight,
  the content of titanium element is less than 0.5%, preferably less than 0.4%, or less than 0.3% by weight,
  the content of free carbon is greater than 0.1%, preferably greater than 0.3%, preferably greater than 0.5% by weight,
  the content of free carbon is less than 2.7%, preferably less than 2%, preferably less than 1.4%, or less than 1%, or less than 0.7% by weight.

This embodiment may in particular result from the use of TiC and carbon as solid-phase sintering additive.

According to a fifth possible embodiment, the product comprises the boron and titanium elements and free carbon in the following proportions:

the sum of the boron and titanium elements, B+Ti, is greater than 0.1%, preferably greater than 0.2% by weight, the sum of the boron and titanium elements, B+Ti, is less than 0.7%, preferably less than 0.6%, or less than 0.5%, or less than 0.4% by weight, the content of free carbon is greater than 0.1%, preferably greater than 0.3%, preferably greater than 0.5% by weight, the content of free carbon is less than 2.7%, preferably less than 2%, preferably less than 1.4%, or less than 1%, or less than 0.7% by weight.

This embodiment may in particular result from the use of $TiB_2$ and carbon as solid-phase sintering additive.

According to a sixth possible embodiment, the product comprises the boron and zirconium elements and free carbon in the following proportions:

the sum of the zirconium and boron elements, Zr+B, is greater than 0.1%, preferably greater than 0.2% by weight, the sum of the zirconium and boron elements, is less than 0.7%, preferably less than 0.6%, or less than 0.5%, or less than 0.4% by weight, the content of free carbon is greater than 0.1%, preferably greater than 0.3%, preferably greater than 0.5% by weight, the content of free carbon is less than 2.7%, preferably less than 2%, preferably less than 1.4%, or less than 1%, or less than 0.7% by weight.

This embodiment may in particular result from the use of $ZrB_2$ and carbon as solid-phase sintering additive.

The sintered product according to the invention has a relative density of greater than 99%, preferably greater than 99.5%, or even greater than 99.7%.

The total sum of the lanthanide elements, actinide elements and yttrium in the product is less than 0.05% by weight, or less than 0.04% by weight or even less than 0.03% by weight. A "lanthanide" element is an element from the Periodic Table of the Elements having an atomic number between 57 and 71. An "actinide" element is an element from the Periodic Table of the Elements having an atomic number between 89 and 103.

In one embodiment, the aluminum content in the product is less than 1000 ppm, or less than 500 ppm, or less than 300 ppm, relative to the weight of said product. In such an embodiment, said aluminum content is preferably greater than 50 ppm, or greater than 100 ppm or even greater than 200 ppm, relative to the weight of said product.

The number of SiC grains having an elongation factor F of greater than 3 is greater than 15%, preferably is greater than 18%, more preferably is greater than 20%.

The number of SiC grains having an elongation factor F of greater than 3 is less than 40%, and preferably is less than 35%, or else is less than 30%, or even is less than 25%.

The number of SiC grains having an elongation factor F of greater than 4 is greater than 2%, preferably greater than 4%, preferably is greater than 6%, more preferably is greater than 8%.

The number of SiC grains having an elongation factor F of greater than 4 is less than 15%, more preferably is less than 12%.

The number of SiC grains having an elongation factor F of greater than 5 is greater than 1%, or is greater than 2%. Preferably this number is less than 8%.

The number of SiC grains having an elongation factor F of greater than 6 is less than 7%, or is less than 6%.

The number of SiC grains having an elongation factor F of greater than 8 is less than 5%, or less than 3%, or less than 1%.

Each grain having an elongation factor F of greater than 3 is in contact with at least one, and preferably with at least two other grains having an elongation factor F of greater than 3.

More than 60% by number of the grains having an elongation factor of greater than 3, preferably more than 70%, preferably more than 80% of said grains, have a width 1 of greater than 2 micrometers.

More than 60% by number of the grains having an elongation factor of greater than 3, or more than 65% of said grains, have a width 1 of greater than 3 micrometers.

More than 20% by number of the grains having an elongation factor of greater than 3, preferably more than 30%, preferably more than 40% of said grains, have a width 1 of greater than 4 micrometers.

More than 10% by number of the grains having an elongation factor of greater than 3, preferably more than 20%, preferably more than 30% of said grains, have a width 1 of greater than 5 micrometers.

More than 15% by number, preferably more than 20% or even more than 25%, of the other SiC grains in said product (i.e. grains for which the factor F is less than 3) have an elongation factor F of greater than 2.

Said other grains have a mean equivalent diameter of greater than 2 micrometers, or greater than 3 micrometers or even greater than 5 micrometers. More preferably said other grains have a mean equivalent diameter of less than 9 micrometers, or less than 7 micrometers.

The product according to the invention comprises no or substantially no intermediate zones between the grains, the oxygen content of which is greater than 15% by weight and the greatest length of which is greater than or equal to 50 nm. Such a characteristic indicates in particular that the sintered product according to the invention is obtained by solid-phase sintering. For example, on the electron microscopy image, such intermediate zones appear in the form of pockets, the product comprising at most one pocket in an assembly of SiC grains equal to 200 grains, and advantageously a single pocket in an assembly of SiC grains equal to 500 grains. In one preferred embodiment, the product does not comprise any pockets. When such a pocket exists within the product according to the invention, its content of oxygen element is less than or equal to 15%, preferably less than or equal to 12%, preferably is less than or equal to 10%, more preferably is less than or equal to 8%, preferably less than or equal to 5%.

The total content of oxygen element in the product according to the invention is preferably less than 1.6%, preferably less than 1.4%, preferably less than 1.2%, preferably less than 1%, or less than 0.7%, or less than 0.5%, or even less than 0.3% by weight.

The elements other than SiC, elemental oxygen, boron, titanium, zirconium and free carbon represent less than 1.5%, or less than 1.2%, or less than 1%, or less than 0.8%, or less than 0.5%, or less than 0.3%, or less than 0.2% by weight. In one embodiment, said elements are impurities, within the meaning described above.

The Vickers hardness of the product, measured at 1 kg, HV1 is greater than 24 GPa, preferably greater than 26 GPa.

The toughness of the product is greater than $2\ MPa \cdot m^{1/2}$, preferably is greater than $2.5\ MPa \cdot m^{1/2}$.

The amount of silicon carbide present in the product in the form of the 4H polytype is greater than 20%, preferably greater than 30%, preferably greater than 40%, preferably greater than 50%, or greater than 60%, on the basis of the sum of all of the silicon carbide polytypes.

The invention also relates to an armor or armor-plating component comprising, as armor-plating means, a sintered product as described above.

Such an object consists of a component (especially a ceramic armor or a ceramic armor component) for protection against projectiles (for example a bullet, shell, mine or a component that is projected during the detonation of explosives, such as bolts, nails (or IED for "Improvized Explosive Device") comprising a part made of a product according to the invention, especially:

an armor component for vehicles, generally in the form of modules such as plates, a helicopter seat, a soldier's helmet, a soldier's chest protector.

This protective component is conventionally composed of a part made of ceramic (the product according to the invention) combined with another material, generally a ductile material, on the rear face, conventionally referred to as "backing", such as fibers, for instance Kevlar® fibers or glass fibers, or metals such as for example aluminum, in plate form.

Upon impact, the ceramic material fragments. The role of the rear face combined with the ceramic material is to absorb, by plastic deformation, the kinetic energy of the debris and to maintain a certain level of containment on the ceramic plate.

The product according to the invention may in particular be obtained by a solid-phase sintering process comprising the following steps:

a) preparation of a starting feedstock comprising:
   a powder of silicon carbide particles,
   a powder of a solid-phase sintering additive,
b) shaping the starting feedstock into the form of a preform,
c) solid-phase sintering of said preform so as to obtain a product according to the invention.

In such a process an initial silicon carbide powder is used for which the median diameter of the particles is less than 5 micrometers, and preferably is less than 4 micrometers.

The median diameter of the particles (or the median "size") of the particles constituting a powder is given, within the meaning of the present invention, by a characterization of particle size distribution. A laser particle size analyzer enables sizes of less than or equal to 3 mm to be measured. The "median diameter" or "median size" of an assembly of particles, in particular of a powder, is referred to as the $D_{50}$ percentile, i.e the size that divides the particles into first and second populations that are equal in volume, these first and second populations comprising only particles that have a size greater than, or less than respectively, the median size.

The product according to the invention is in particular obtained by a process as described above, in which the sintering additive is selected from carbon, carbides of boron, titanium and zirconium or borides of zirconium and titanium, alone or as a mixture.

In one particularly preferred embodiment, the product is obtained by a process as described above in which the sintering additive comprises or consists of a mixture of boron carbide and carbon.

More detailed information is given below regarding a process that makes it possible to obtain the sintered product according to the invention:

The silicon carbide powder used initially may require a reduction of its size in order to conform to the ranges described above. This reduction in size is generally achieved by milling according to techniques known to a person skilled in the art, such as for example using a ball mill or a jar mill, with silicon carbide balls.

Preferably, the median size of the silicon carbide powder used, after optional milling, is less than 5 μm, preferably less than 4 μm, preferably less than 3 μm, preferably less than 2 μm, preferably less than 1.5 μm.

Preferably, the silicon carbide powder has a content of oxygen element of less than 2%, preferably less than 1.6%, preferably less than 1.4%, preferably less than 1.2%, preferably less than 1%, or less than 0.7%, or less than 0.5%, or even less than 0.3% by weight. In one embodiment, the content of oxygen element of the silicon carbide powder may be reduced before use by any technique known to a person skilled in the art, such as for example acid washing.

According to one essential feature of the present invention, the amount of solid-phase sintering additives and their respective nature are adapted and selected so that the sintering in step c) is a solid-phase sintering.

The amount of solid-phase sintering additives is preferably between 0.1% and 4% by weight of the starting feedstock.

The solid-phase sintering additives may be preferably selected from:

compounds of boron, titanium and zirconium, such as carbides, for instance $B_4C$ and $TiC$, borides, for instance $ZrB_2$ and $TiB_2$, and also precursors of said compounds, and/or free carbon, and also precursors of free carbon, such as a phenolic resin.

In one particularly preferred embodiment, the solid-phase sintering additives used are a mixture of $B_4C$ and carbon, the amount of $B_4C$ being greater than 0.1%, preferably greater than 0.2% and less than 0.7%, preferably less than 0.6%, or less than 0.5%, or less than 0.4% as weight percentages of the starting feedstock, and the amount of carbon is greater than 0.1%, preferably greater than 0.3%, more preferably greater than 0.6% and less than 3%, preferably less than 2%, preferably less than 1.5%, or less than 1%, or less than 0.8% as weight percentages of the starting feedstock.

In another possible embodiment, the solid-phase sintering additive used is $B_4C$ in an amount greater than 0.1%, preferably greater than 0.2% and less than 0.7%, preferably less than 0.6%, or less than 0.5%, or less than 0.4% as weight percentages of the starting feedstock and the elemental oxygen content of the silicon carbide powder of the starting feedstock is less than 0.3%.

In another possible embodiment, the solid-phase sintering additive used is carbon in an amount greater than 0.1%, preferably greater than 0.3%, more preferably greater than 0.6% and less than 3%, preferably less than 2%, preferably less than 1.5%, or less than 1%, or less than 0.8% as weight percentages of the starting feedstock.

In another possible embodiment, the solid-phase sintering additives used are a mixture of TiC and carbon, the amount of TiC being greater than 0.1%, preferably greater than 0.2% and less than 0.7%, preferably less than 0.6%, or less than 0.5%, or less than 0.4% as weight percentages of the starting feedstock and the amount of carbon is greater than 0.1%, preferably greater than 0.3%, more preferably greater than 0.6% and less than 3%, preferably less than 2%, preferably less than 1.5%, or less than 1%, or less than 0.8% as weight percentages of the starting feedstock.

In another possible embodiment, the solid-phase sintering additives used are a mixture of $TiB_2$ and carbon, the amount of $TiB_2$ being greater than 0.1%, preferably greater than 0.2% and less than 0.7%, preferably less than 0.6%, or less than 0.5%, or less than 0.4% as weight percentages of the starting feedstock and the amount of carbon is greater than 0.1%, preferably greater than 0.3%, more preferably greater than 0.6% and less than 3%, preferably less than 2%, preferably less than 1.5%, or less than 1%, or less than 0.8% as weight percentages of the starting feedstock.

In another possible embodiment, the solid-phase sintering additives used are a mixture of $ZrB_2$ and carbon, the amount of $ZrB_2$ being greater than 0.1%, preferably greater than 0.2% and less than 0.7%, preferably less than 0.6%, or less than 0.5%, or less than 0.4% as weight percentages of the starting feedstock and the amount of carbon is greater than 0.1%, preferably greater than 0.3%, more preferably greater than 0.6% and less than 3%, preferably less than 2%, preferably less than 1.5%, or less than 1%, or less than 0.8% as weight percentages of the starting feedstock.

In one embodiment, the aluminum content of the starting feedstock is less than 1000 ppm, or less than 500 ppm, or less than 300 ppm, relative to the weight of the starting feedstock.

Preferably, the median size of the powders of solid-phase sintering additives used is less than 1.2 times the median size of the grains of the silicon carbide powder, preferably less than 1.4 times, or less than 1.6 times, or even very preferably less than 1.8 times the median size of the grains of the silicon carbide powder.

In one embodiment, the starting feedstock contains a binder and/or a lubricant and/or a surfactant.

In one embodiment, the starting feedstock contains no binder.

The mixing is carried out so as to obtain a good homogeneity of distribution of the various elements, it being possible to adapt the mixing time in order to achieve this result.

Preferably, the mixing is carried out in a jar mill, the mixing time is greater than 15 hours. A mixing time of 24 hours is particularly suitable.

When the mixture is obtained, it can be atomized or granulated, for example by "freeze granulation", in order to obtain granules that will be shaped, for example by pressing, in order to obtain a ceramic preform. Other shaping techniques may be used, such as injection molding and slip casting.

After shaping, the preform may be machined.

The preform is then sintered. Preferably the sintering is carried out in the presence of a pressure applied to the preform during the sintering. Hot pressing, hot isostatic pressing or SPS (spark plasma sintering) techniques are particularly suitable. <See homogeneity with the example for which the part is pressed unidirectionally and then sintered>.

The sintering temperature is greater than 1700° C., preferably greater than 1800° C., preferably greater than 1850° C., or greater than 1950° C. and less than 2300° C., or less than 2200° C.

If a pressure is applied during the sintering, this pressure is greater than 10 MPa, preferably greater than 20 MPa, preferably greater than 35 MPa and less than 500 MPa, preferably less than 300 MPa, or less than 200 MPa, or less than 100 MPa, or less than 75 MPa, or less than 55 MPa.

The high-temperature hold time may be zero, in particular during sintering by SPS. Preferably this hold time is greater than 0.5 minute, preferably greater than 1 minute, preferably greater than 2 minutes, preferably greater than 4 minutes and less than 60 minutes, preferably less than 30 minutes, preferably less than 20 minutes, preferably less than 10 minutes, preferably less than 6 minutes. A sintering time equal to 5 minutes is particularly suitable. The rate of increase to the maximum temperature is preferably greater than 10° C./min, or greater than 30° C./min, or greater than 50° C./min, or greater than 100° C./min.

The firing takes place under a controlled atmosphere, preferably under vacuum or under argon or under nitrogen.

The temperature and/or the hold time at the maximum temperature of the sintering cycle determine the presence and the amount of grains having a form factor F>3.

The following rules may be adopted in order to adjust the microstructure of the product after sintering: to increase the number of the grains of elongated shape, and/or to increase the elongation factor of the grains and/or to increase the mean equivalent diameter of the grains supplementary to the grains of elongated shape, the maximum temperature of the sintering cycle is increased and/or the hold time is increased.

The following examples are given purely by way of illustration and do not limit the scope of the present invention in any of the aspects described.

Example 1

Comparative

The product of comparative example 1 is a commercial product made of Hexoloy® SA silicon carbide, sold by the company Saint-Gobain Ceramics. It is manufactured by solid-phase sintering using $B_4C$ and carbon as sintering additive. It is commonly used in installations as armor-plating component for protection against projectiles.

Example 2

According to the Invention

The product of example 2 according to the invention is obtained in the following manner:
A slip was prepared by mixing:
1876 grams of water,
1927 grams of a silicon carbide powder having a specific surface area of 8.6 $m^2/g$, a median particle size equal to 1.08 µm, a content of oxygen element equal to 0.27% by weight, after acid washing. The powder consists of more than 98% by weight of silicon carbide particles,
5.9 grams of a $B_4C$ boron carbide powder with the reference Norbide Boron Carbide® sold by the company Saint-Gobain Industrial Ceramics, having a median particle size equal to 3.6 µm, and a $B_4C$ content of greater than 98%. The weight of the $B_4C$ powder, first sintering additive, represents 0.3% of the total weight of the silicon carbide powder and $B_4C$ powder,
42.3 grams of Plyophen 43290® phenolic resin, sold by the company Durez. The resin is a precursor of carbon, used as second sintering additive,
0.79 gram of Castament FS10® sold by the company BASF, i.e. 0.04% of the weight of the silicon carbide powder.

The solids content is equal to 50% of the weight of the slip.

The pH of the slip is adjusted to 11.5 by an addition of ammonium hydroxide. No binder is introduced into the slip.

The mixing is carried out in a jar mill, for 48 hours, with Cylpebs.

The slip is then cast, in a stainless steel tray, in the form of a sheet having a thickness equal to 4 cm. This sheet is then frozen with a solidification front speed equal to 8 µm/s.

After freezing, the ice crystals are removed via sublimation, by placing the frozen sheet under a vacuum equal to 400 µbar and at a temperature equal to −20° C. The temperature is then increased up to 40° C. in order to dry the agglomerates formed.

The agglomerates obtained are milled in a model CB220 mill from the company Sodémi with a vibrating bowl internally comprising 2 moving bodies (a disc and a ring) so as to obtain an agglomerate powder having a median agglomerate size of between 3 and 50 μm. The residual moisture content is equal to 0.6%.

The agglomerate powder is introduced into a SPS (spark plasma sintering or flash sintering) die so as to obtain, after sintering, sintered parts having a diameter equal to 80 mm and a thickness of around 4 mm.

The SPS step is the following:
temperature rise at 50° C. per minute to a temperature of 2000° C.,
temperature hold of 5 minutes at 2000° C.,
temperature drop by controlled cooling at 50° C./min down to 600° C.,
temperature drop by free cooling from 600° C. to ambient temperature.

The pressure applied during the temperature rise cycle and the temperature hold is 40 MPa. The diameter of the die is 80 mm. The weight of powder used is 66 g.

Example 3

Comparative

The product of comparative example 3 is a silicon carbide product obtained this time by liquid-phase sintering and that contains, between the SiC grains, a secondary phase essentially comprising the elements Y, Al, Si and O, in a crystallized form.

It is manufactured according to the following process:
A slip was prepared by mixing:
2212 grams of water,
2205 grams of a Starck UF25® silicon carbide powder having a specific surface area of 25 m$^2$/g, a median particle size equal to 0.43 μm, a content of oxygen element equal to 1.7% by weight, and that contains more than 98% of silicon carbide,
245 grams of a YAG ($Y_3Al_5O_{12}$) powder, sold by the company Baikowski, having a median particle size equal to 0.18 μm, and a $Y_3Al_5O_{12}$ content of greater than 99.5%. The total weight of the $Y_3Al_5O_{12}$ powder represents 10% of the total pulverulent weight (silicon carbide+$Y_3Al_5O_{12}$),
0.86 gram of Castament FS10® sold by the company BASF, i.e. 0.039% of the weight of the silicon carbide powder. The solids content is equal to 50% of the weight of the slip. The pH of the slip was adjusted to 11.5 by addition of 1M sodium hydroxide.

No binder was introduced into the slip.

The mixing was carried out in a jar mill, for 24 hours, with Cylpebs.

The slip is then cast, in a stainless steel tray, in the form of a sheet having a thickness equal to 4 cm. This sheet is then frozen with a solidification front speed equal to 8 μm/s.

After freezing, the ice crystals are removed via sublimation, by placing the frozen sheet under a vacuum equal to 400 μbar and at a temperature equal to −20° C. The temperature is then increased up to 40° C. in order to dry the agglomerates formed.

The agglomerates obtained are milled in a model CB220 mill from the company Sodémi with a vibrating bowl internally comprising 2 moving bodies (a disc and a ring) so as to obtain an agglomerate powder having a median agglomerate size of between 3 and 50 μm. The residual moisture content is equal to 0.6%.

Preforms with dimensions of 80×80×12 mm$^3$ are obtained by cold unidirectional pressing, at a pressure equal to 60 MPa, then sintered under argon, so as to obtain sintered parts, in the following cycle:

temperature rise to 400° C. at a rate of 800° C./h,
temperature rise from 400° C. to 1000° C. at a rate equal to 400° C./h,
temperature rise from 1000° C. to 1775° C. at a rate equal to 230° C./h,
temperature rise from 1775° C. to 1875° C. at a rate equal to 100° C./h,
temperature hold of 0.5 hour at 1875° C.,
temperature drop by free cooling.

The characteristics and properties of the products obtained according to the preceding examples 1 to 3 are measured according to the following techniques:

The bulk density is measured by impregnation, according to the buoyancy principle.

The absolute density is measured by helium pycnometry using an AccuPyc 1330 device from Micromeretics®, on a powder of milled product having a maximum size of less than 160 μm.

The microstructure of the materials constituting the products from examples 1 to 3 is studied according to the conventional techniques of scanning electron microscopy on a cross section of said product.

More specifically, the samples are prepared in the following manner:
cross-sectioning of the material using a diamond saw,
polishing until mirror quality is obtained,
chemical attack that aims to reveal the grains and the grain boundaries; the chemical attack consisting in immersing the mirror-quality polished samples for 15 minutes in a mixture, brought to boiling point, of 60 ml of water, 17 g of potassium hexacyanoferrate and 20 g of potassium hydroxide.

After this preparation, the cross sections of the samples according to examples 1 to 3 are observed according to customary electron microscopy techniques.

Figure 2:
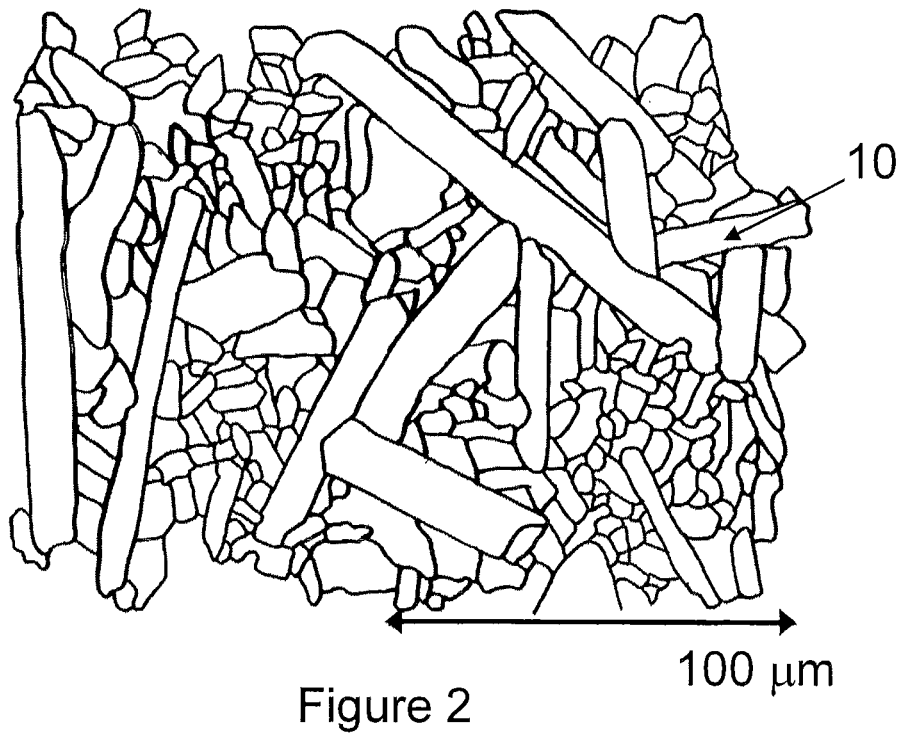
FIG. 2 is a representation of the image obtained using a scanning electron microscope of a sample according to example 2 in accordance with an embodiment of the invention.

Appended FIGS. 1 and 2 are representations of the images obtained during observation, using a scanning electron microscope, respectively of the samples according to examples 1 and 2. Observed on these photographs is an assembly of grains (10) that are directly bonded to one another, with no intermediate pockets visible.

According to the invention and from several images illustrated by the appended FIGS. 1 and 2, for each grain the length L and the width l of the grains (10), and also the corresponding elongation factor F, within the meaning described above, are determined. The number of grains thus analyzed on the images according to the invention (illustrated by FIG. 2) is around 1300 grains. This factor is representative of the anisotropy of the SiC grains constituting each material.

Without departing from the scope of the invention, in order to accelerate the processing of the images, the measurement of the elongation factor could of course be automated by means of any known image processing software, such as the imageJ® software. It has for example been verified by the applicant company that the measurement made by this software, using the "Fit ellipse" function, gave results substantially identical to those obtained by direct measurement on the electron microscopy image.

The oxygen content of the product is measured by the following method: the product, milled to a size of less than 160 micrometers and dried, placed in a graphite crucible, is put into a LECO TC 436 DR analyzer, and undergoes thermal decomposition under helium. The evolution gas is analyzed by a calibrated infrared detector. The oxygen content is determined from the measurement of the evolution of CO and $CO_2$.

The free carbon content of the product is measured by the following method:

The total carbon content of a sample of the product, milled to a size of less than 160 micrometers, is measured according to the ANSI B74.15-1992 (R2007) standard, by the "resistance furnace technique" method. This content is referred to as CT1.

The oxygen content of a sample of the product, milled to a size of less than 160 micrometers, is measured according to the method described above. This content is referred to as O1.

A sample of the product, milled to a size of less than 160 micrometers, is heat-treated in air at a temperature equal to 750° C. for a hold time necessary for the weight uptake of the sample. The sample is immediately removed from the furnace when the weight uptake is observed. On said sample, the total carbon content is measured according to the ANSI B74.15-1992 standard, by the "resistance furnace technique" method and the oxygen content is measured according to the method described above, which are referred to as CT2 and O2, respectively.

The amount O2–O1 is equal to the amount of oxygen originating from the oxidation of the SiC during the heat treatment in air at 750° C. This amount of oxygen is converted to an equivalent amount of carbon, CT3, by the following formula: $CT3 = 12 \times (O2-O1)/32$.

The free carbon content of the product $C_1$ is given by the following calculation: $C_1 = CT1 - CT2 - CT3$.

The boron content in the product is measured by quantitative assay, conventionally by ICP-MS (inductively coupled plasma mass spectrometry) on leachate after decomposition of the product by potassium carbonate at 250° C.

The content of other elements in the product is determined by x-ray fluorescence on beads obtained after attack of the product with lithium tetraborate.

The amount of silicon carbide present as the 4H polytype in the product is determined by x-ray diffraction, with Rietveld refinement. The amount of silicon carbide present as the 4H polytype in the product from example 2 according to the invention is equal to 58% on the basis of the sum of all the silicon carbide polytypes measured, the remainder essentially consisting of the 6H polytype.

The resistance to the penetration by a projectile is measured by the "depth of penetration test" method as described below:

A part with dimensions of $150 \times 150 \times 60 \text{ mm}^3$ made of aluminum 2024 and having, on one of its large faces, a housing with the dimensions of the silicon carbide part to be tested, i.e. here a housing having a diameter equal to 80 mm and a depth equal to 4 mm for the product according to the invention and a housing having a cross-section equal to 60 mm×60 mm and a depth equal to 4 mm for the products from comparative examples 1 and 3, constitutes the "backing". There is a gap between the housing and the silicon carbide part to be tested of at most 0.5 mm.

After machining to the dimensions, the silicon carbide part to be tested is adhesively bonded in the housing using a Loctite adhesive.

The assembly is then subjected to the impact of an AP8 7.62×51 mm piercing projectile consisting of a tungsten carbide core, fired at a distance from said assembly equal to 15 meters and at a speed equal to 930 m/s, said projectile being fired so that it hits the silicon carbide part substantially perpendicularly.

After the impact, the depth of penetration of the projectile into the aluminum "backing" is measured with a depth gauge.

The main characteristics of the process and of the measurements made on the product obtained according to examples 1 to 3 are reported in table 1 below:

TABLE 1

|  | Example 1 (comp.) | Example 2 (inv.) | Example 3 (comp.) |
|---|---|---|---|
| Silicon carbide (%) | 98.25 | 99.46 | 88.3 |
| Content of oxygen element (%) | 0.37 | 0.12 | 3.72 |
| Content of free carbon (%) | 0.74 | 0.17 | 0.1 |
| Content of B element (%) | 0.51 | 0.15 | 0.01 |
| Content of Y element (%) | — | 0.02 | 5.35 |
| Content of Al element (%) | 0.09 | 0.03 | 2.42 |
| Other elements (%) | 0.04 | 0.05 | 0.1 |
| Relative density (%) | 98.5 | 99 | 98.6 |
| Number of SiC grains having an elongation factor F of greater than 3, as % on the basis of the number of SiC grains | 4 | 21 | * |
| Number of SiC grains having an elongation factor F of greater than 4, as % on the basis of the number of SiC grains | 1 | 9 | * |
| Number of SiC grains having an elongation factor F of greater than 5, as % and on the basis of the number of SiC grains | 0 | 5 | * |
| Number of SiC grains having an elongation factor F of greater than 6, as % and on the basis of the number of SiC grains | 0 | 2 | * |
| Number of SiC grains with: F > 3 width 1 > 3 μm as % on the basis of the total number of SiC grains with F > 3 | 0 | 65 | * |
| Number of SiC grains with: F > 3 width 1 > 4 μm as % on the basis of the total number of SiC grains with F > 3 | 0 | 47 | * |
| Mean equivalent diameter of the SiC grains other than those with F > 3 (μm) | 3.4 | 6.4 | 2.9 |
| Depth of penetration, for a silicon carbide thickness equal to 4 mm (mm) | 17.1 | 12.3 | 18 |

* not measured

As the data reported in table 1 shows, the penetration of an AP8 7.62×51 bullet into the aluminum 2024 backing protected by silicon carbide armor-plating having a thickness equal to 4 mm, is equal to 17.1 mm on the product from the comparative example and only 12.3 mm for the product according to the invention, i.e. a reduction of the penetration into the backing of 28%.

It is also seen that the sintered product according to comparative example 3 has a much worse impact resistance than that of the sintered product according to the invention (example 2). This difference could be explained by the liquid-phase sintering of the silicon carbide, which generates, in the sintered product obtained, a second phase at the grain boundaries, the presence of which appears to be detrimental to the resistance of the sintered material to the impact of a projectile.

Of course, the present invention is not limited to the embodiments described and represented, provided by way of example. In particular, combinations of the various embodiments described also fall within the scope of the invention.

Neither is the invention limited by the shape or dimensions of the sintered product based on silicon carbide.

The invention claimed is:

1. A product obtained by solid-phase sintering of a silicon carbide powder and of a sintering additive, said product having a relative density of greater than 98.5% and comprising:

more than 92% by weight of SiC present in the form of grains, less than 2% by weight of elemental oxygen, and less than 6% by weight, in total, of other elements, wherein:

more than 10% by number of the SiC grains, on the basis of a total number of said SiC grains, have an elongation factor greater than 3, more than 50% by number of said SiC grains, the elongation factor of which is greater than 3, have a width of greater than 3 micrometers, and a remaining number of SiC grains, of the total number of said SiC grains, in said product have a mean equivalent diameter greater than 1 micrometer and less than 20 micrometers and the number of SiC grains having an elongation factor greater than 6 is less than 7%, and wherein the product has an aluminum content that is less than 1000 ppm relative to the weight of said product.

2. The product as claimed in claim 1, comprising between 0.1% and 4% by weight of at least one other element chosen from boron, titanium, zirconium and free carbon and less than 2% by weight, in total, of other elements.

3. The product as claimed in claim 2, wherein a sum, by weight, of the at least one other element chosen boron, free carbon, titanium and zirconium is between 0.2% and 3.2% by weight.

4. The product as claimed in claim 3, wherein the sum, by weight, of the at least one other element chosen boron, free carbon, titanium and zirconium is less than 2% by weight.

5. The product as claimed in claim 1, wherein the sintering additive is selected from carbon, carbides of boron, titanium and zirconium or borides of zirconium and titanium, alone or as a mixture.

6. The sintered product as claimed in claim 1, comprising between 0.1% and 0.5% by weight of boron and between 0.1% and 2.7% by weight of free carbon.

7. The product as claimed in claim 6, wherein the sintering additive comprises or consists of a mixture of boron carbide and carbon.

8. The sintered product as claimed in claim 1, having a relative density of greater than 99%.

9. The sintered product as claimed in claim 1, wherein a total sum of lanthanide elements, actinide elements and yttrium in the product is less than 0.05% by weight.

10. The sintered product as claimed in claim 1, wherein the aluminum content is greater than 50 ppm, relative to the weight of said product.

11. The product as claimed in claim 1, wherein the number of SiC grains having an elongation factor greater than 3 is greater than 15% and less than 40%.

12. The product as claimed in claim 1, wherein more than 60% by number of SiC grains, having an elongation factor greater than 3, have a width greater than 3 micrometers.

13. The product as claimed in claim 1, wherein the number of SiC grains having an elongation factor greater than 4 is greater than 2% and is less than 15%.

14. The product as claimed in claim 1, wherein the number of SiC grains having an elongation factor greater than 5 is greater than 1% and is less than 8%.

15. The product as claimed in claim 1, wherein the number of SiC grains having an elongation factor greater than 8 is less than 1%.

16. The product as claimed in claim 1, wherein each grain having an elongation factor greater than 3 is in contact with at least one other grain having an elongation factor greater than 3.

17. The product as claimed in claim 1, wherein more than 20% of the grains, having an elongation factor greater than 3, additionally have a width greater than 4 micrometers.

18. The product as claimed in claim 1, wherein more than 15% by number of said other SiC grains in said product have an elongation factor greater than 2.

19. The product as claimed in claim 1, wherein the other SiC grains in said product have a mean equivalent diameter of greater than 2 micrometers and less than 9 micrometers.

20. The product as claimed in claim 19, wherein the other SiC grains in said product have a mean equivalent diameter greater than 4 micrometers.

21. The product as claimed in claim 1, comprising no or substantially no intermediate zones between the SiC grains, the oxygen content of which is greater than 15% by weight and a greatest length of which is greater than or equal to 50 nm.

22. The product as claimed in claim 1, wherein the total content of oxygen element is less than 1% by weight.

23. An armor or armor-plating component comprising, a sintered product as claimed in claim 1.

24. The product as claimed in claim 11, wherein the number of SiC grains having an elongation factor greater than 3 is greater than 18% and less than 35%.

25. The product as claimed in claim 16, wherein each grain having an elongation factor greater than 3 is in contact with at least two other grains having an elongation factor greater than 3.

26. The product as claimed in claim 17, wherein more than 30% of the grains having an elongation factor greater than 3 additionally have a width of greater than 4 micrometers.

27. The product as claimed in claim 18, wherein more than 20% by number of said other SiC grains in said product have an elongation factor greater than 2.

28. The product as claimed in claim 20, wherein the other SiC grains in said product have a mean equivalent diameter greater than 5 micrometers.

* * * * *